United States Patent [19]
Mackay

[11] Patent Number: 5,729,980
[45] Date of Patent: Mar. 24, 1998

[54] INTERNAL COMBUSTION ENGINES

[75] Inventor: Stewart Alexander Mackay, Crewe, United Kingdom

[73] Assignee: Rolls-Royce Motor Cars Limited, Cheshire, United Kingdom

[21] Appl. No.: 698,774

[22] PCT Filed: May 12, 1993

[86] PCT No.: PCT/GB93/00976

§ 371 Date: Nov. 3, 1994

§ 102(e) Date: Nov. 3, 1994

[87] PCT Pub. No.: WO93/23661

PCT Pub. Date: Nov. 25, 1993

Related U.S. Application Data

[63] Continuation of Ser. No. 331,616, Nov. 3, 1994, abandoned.

[30] Foreign Application Priority Data

May 14, 1992 [GB] United Kingdom .................. 9210339
Oct. 13, 1992 [GB] United Kingdom .................. 9221500

[51] Int. Cl.⁶ ................................................ F02B 37/12
[52] U.S. Cl. ................................................ 60/602
[58] Field of Search .......................... 60/600–603, 611; 123/564

[56] References Cited

U.S. PATENT DOCUMENTS 3,233,403  2/1966  MacInnes et al. .
4,449,367  5/1984  Moriguchi et al. .................. 60/602
4,467,607  8/1984  Rydquist et al. .................... 60/602
4,519,210  5/1985  Iwamoto et al. .
4,528,816  7/1985  Arnaud ................................. 60/602
4,597,264  7/1986  Cipolla ................................. 60/602
4,637,210  1/1987  Yamamoto ........................... 60/602
4,697,421  10/1987  Otobe et al. ........................ 60/602
4,763,475  8/1988  Toshio et al. ....................... 60/602
5,155,998  10/1992  Monden .............................. 60/602

FOREIGN PATENT DOCUMENTS 0111196  6/1984  European Pat. Off. .
2148391  5/1985  United Kingdom .

*Primary Examiner*—Michael Koczo
*Attorney, Agent, or Firm*—Cushman Darby & Cushman Intellectual Property Group of Pillsbury Madison & Sutro LLP

[57] ABSTRACT

Pressure charging apparatus, which may be a turbocharger or a supercharger, for an internal combustion engine comprises a pressure supply, a wastegate, a wastegate actuator for closing and opening the wastegate in order to alter the pressure in the engine inlet, a boost control for controlling the wastegate actuator, a boost control solenoid valve, a switchover valve, electronic control units and a full throttle sensor. In operation, unit receives signals, inter alia, from the sensor to control valves to positively shut the wastegate until an overboost threshold is reached thereby minimizing boost lag during this period.

9 Claims, 10 Drawing Sheets

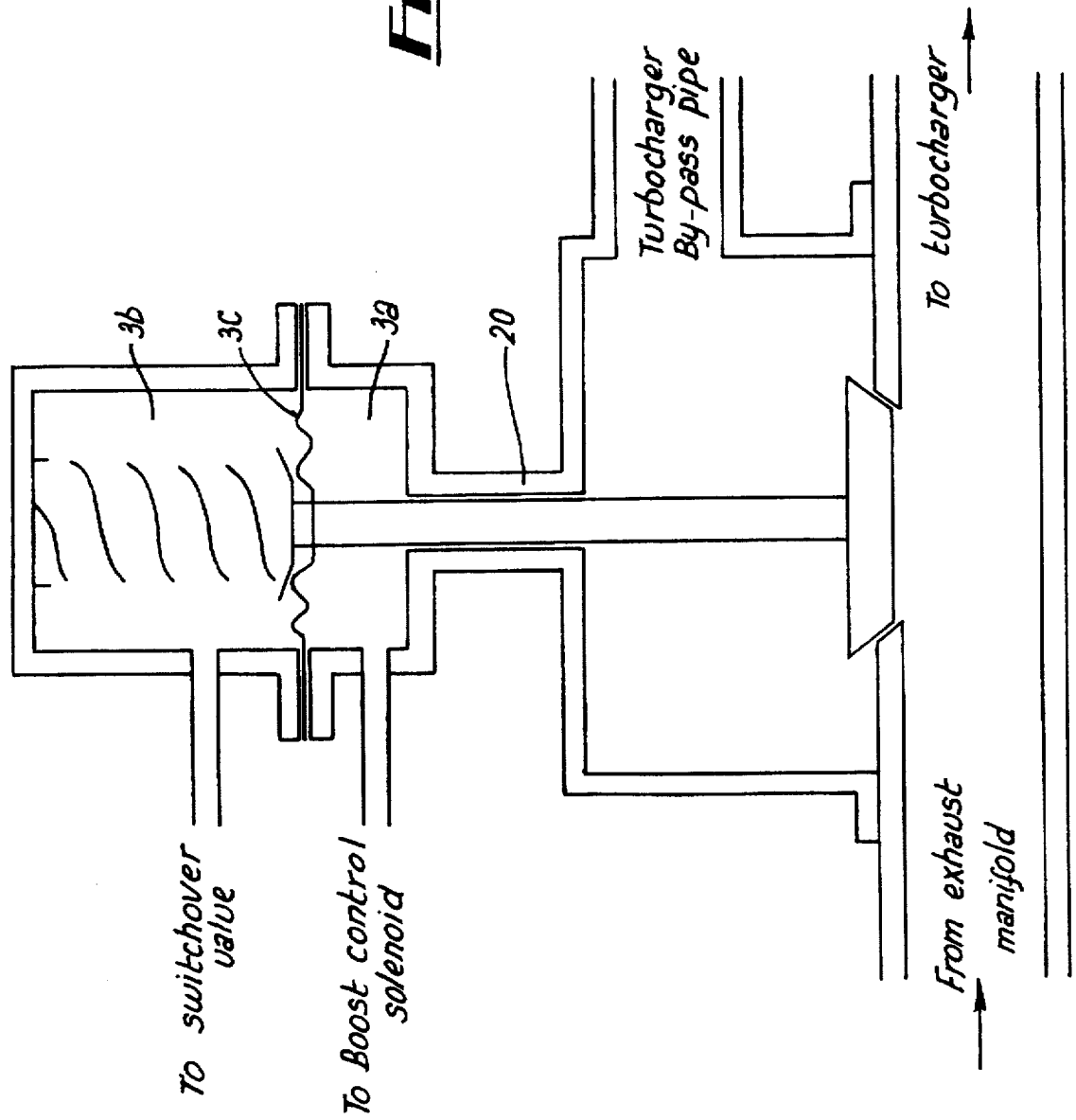

INTERNAL COMBUSTION ENGINES

This is a continuation of application Ser. No. 08/331,616, filed on Nov. 3, 1994, which was abandoned upon the filing hereof.

FIELD OF THE INVENTION

The present invention relates to pressure charging apparatus for internal combustion engines.

BACKGROUND AND SUMMARY OF THE INVENTION

The pressure charging apparatus may be a turbocharger or a supercharger in which, typically, in one known arrangement, engine boost level is controlled by a pneumatically controlled wastegate mechanism. The engine boost level is defined as the pressure level, relative to atmospheric, to which the turbocharger or supercharger compresses the air charge in the inlet manifold. The wastegate position, which controls the boost level is in turn controlled by a controlling pneumatic pressure which is regulated by a boost control solenoid valve. The boost control solenoid valve, which is fitted between the wastegate actuator mechanism and a pressure source (or reservoir), is actuated by an electrical control signal. This may be in the form of a voltage, frequency or duty cycle. The boost control solenoid valve is of a type where the full supply pressure is diverted to the wastegate actuator to open it fully (causing low engine boost) when a 'low' signal is supplied to the solenoid. The full supply pressure is diverted to vent away and no pressure reaches the wastegate actuator (causing high engine boost), when a 'high' signal is supplied to the solenoid. The solenoid operation is infinitely variable between these two extremes.

The signal to the boost control solenoid valve is usually supplied from an Electrical Control Unit (ECU), which may use engine speed, boost pressure and engine load amongst the incoming parameters. This enables the boost pressure to be controlled as desired via the action of the boost control solenoid valve. The ECU is pre-programmed to provide the desired boost levels dependent upon the incoming parameters. Additional safeguards may be incorporated into the inputs to the ECU, such that a low signal is sent to the boost control solenoid valve under conditions of engine stress (vibration or combustion detonation as examples) or for reason of vehicle safety inhibits (cruise control operation, vehicle braking and gearchange operation examples).

The existing arrangement is such that when a change is made to the electrical signal to the boost control solenoid valve, there is a delay before the wastegate actuator assumes the new position. This delay is dependent upon the control dynamics of the system such as the length of pipes and volume of the wastegate actuator and is generally engineered to be small. Under conditions of a changing signal to the boost control solenoid valve, there may also be a tracking error present that is to say the difference between the required and actual signal levels. This may occur under conditions of engine acceleration.

The existing arrangement does not permit the control dynamics to be altered in response either to the nature of the inputs to the ECU or to the state of the output from the ECU to the boost control solenoid valve.

According to the present invention there is provided pressure charging apparatus for internal combustion engines comprising means for supplying air under pressure to the engine inlet, a wastegate, a wastegate actuator for closing and opening the wastegate in order to alter the pressure in the engine inlet, characterised by a boost control for controlling the wastegate actuator, first valve means connected to the wastegate actuator and to the boost control, and control means operative to control the operation of second valve means in dependence, inter alia, upon a signal from a full throttle sensor and thereby the wastegate actuator.

In a preferred embodiment of the invention, the means for supplying air comprises an air compressor. The first valve means comprises a boost control solenoid valve operative in one position to vent to atmosphere. The second valve means is operative to connect the wastegate actuator (on the opposing side) to the means for supplying air or to atmosphere. The boost control is programmed to operate the boost control solenoid valve at a duty cycle which may be infinitely variable between 0 and 100%. The duty cycles are advantageously 100% and 70%.

In order that the invention may be more-clearly understood, two embodiments thereof will now be described, by way of example, with reference to the accompanying drawings, in which:

FIG. 1 diagrammatically shows an existing internal combustion engine boost control system, FIG. 2 diagrammatically shows an internal combustion engine boost control system according to the invention, FIG. 3a shows duty cycle plotted against engine speed for the arrangements of FIGS. 1 and 2 (that for FIG. 1 is shown in solid line and that for FIG. 2 is shown in dotted line).

Figure 1:
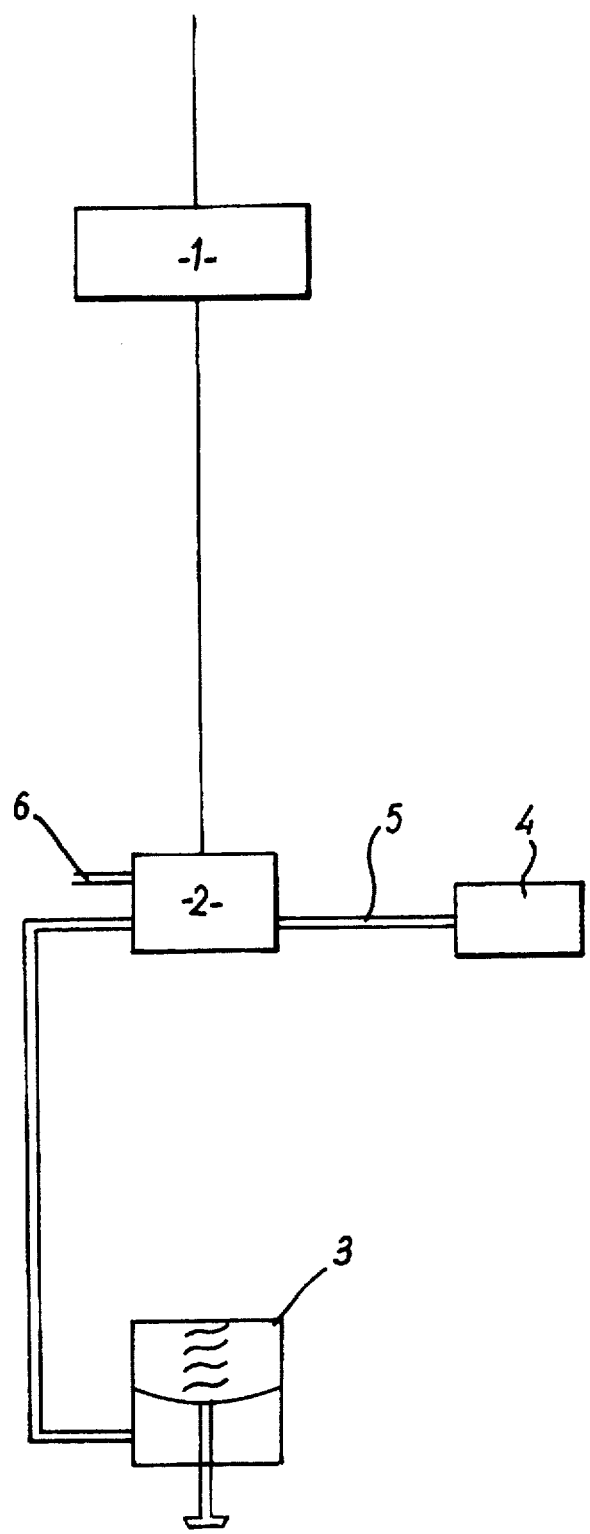
Figure 2:
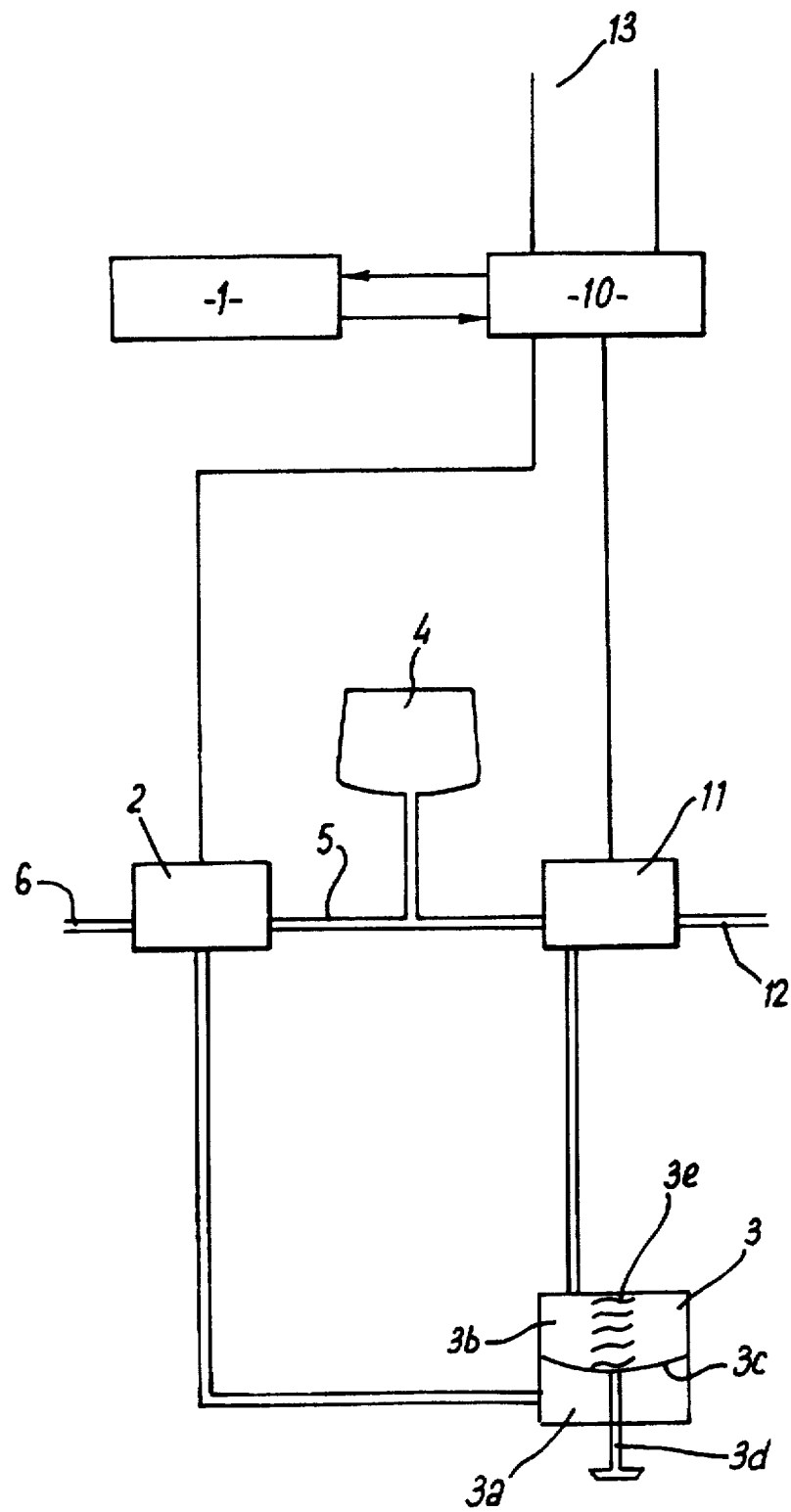
Figure 4A:
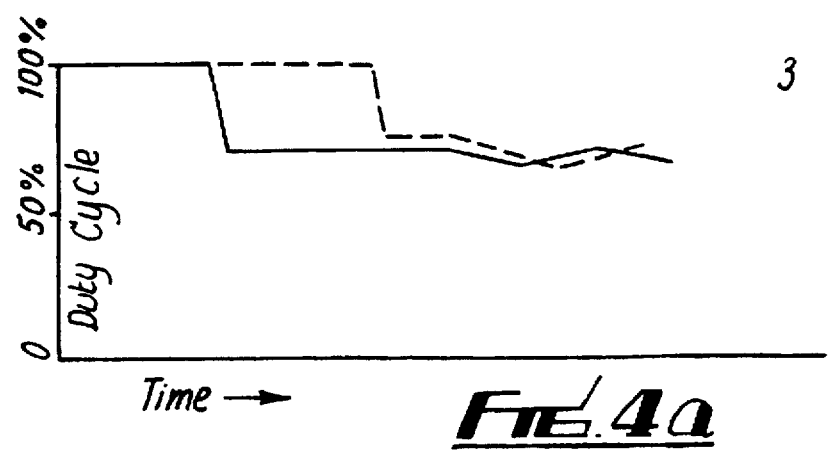
FIG. 4a shows duty cycle plotted against time for the arrangements of FIGS. 1 and 2 (that for FIG. 1 is shown in solid line and that for FIG. 2 is shown in dotted line).
Figure 4B:
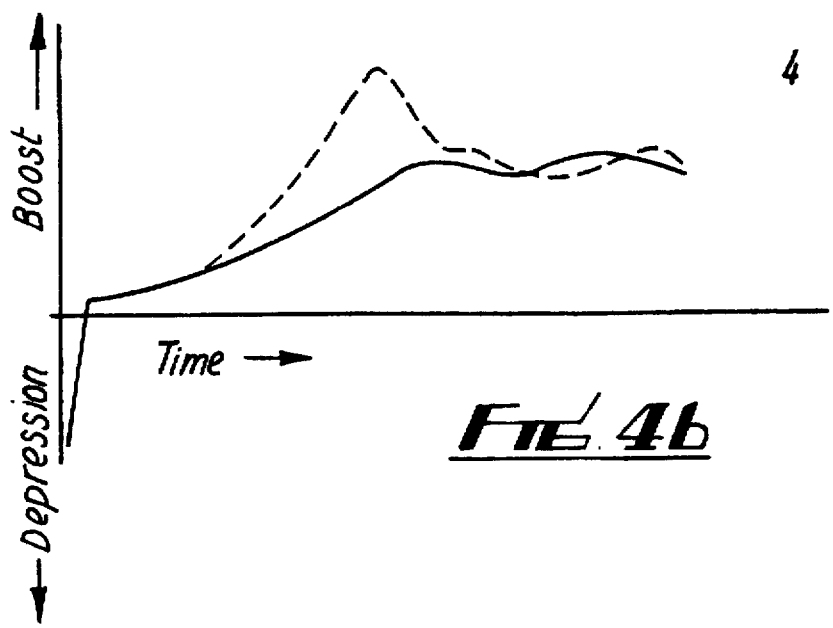
Figure 4C:
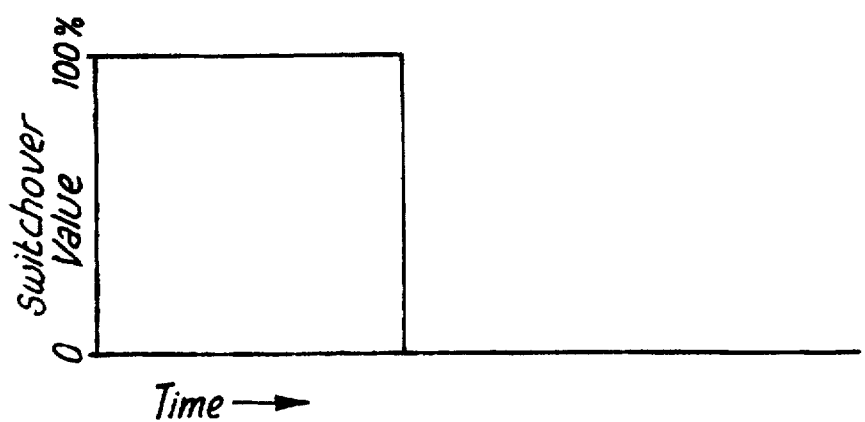
Figure 5:
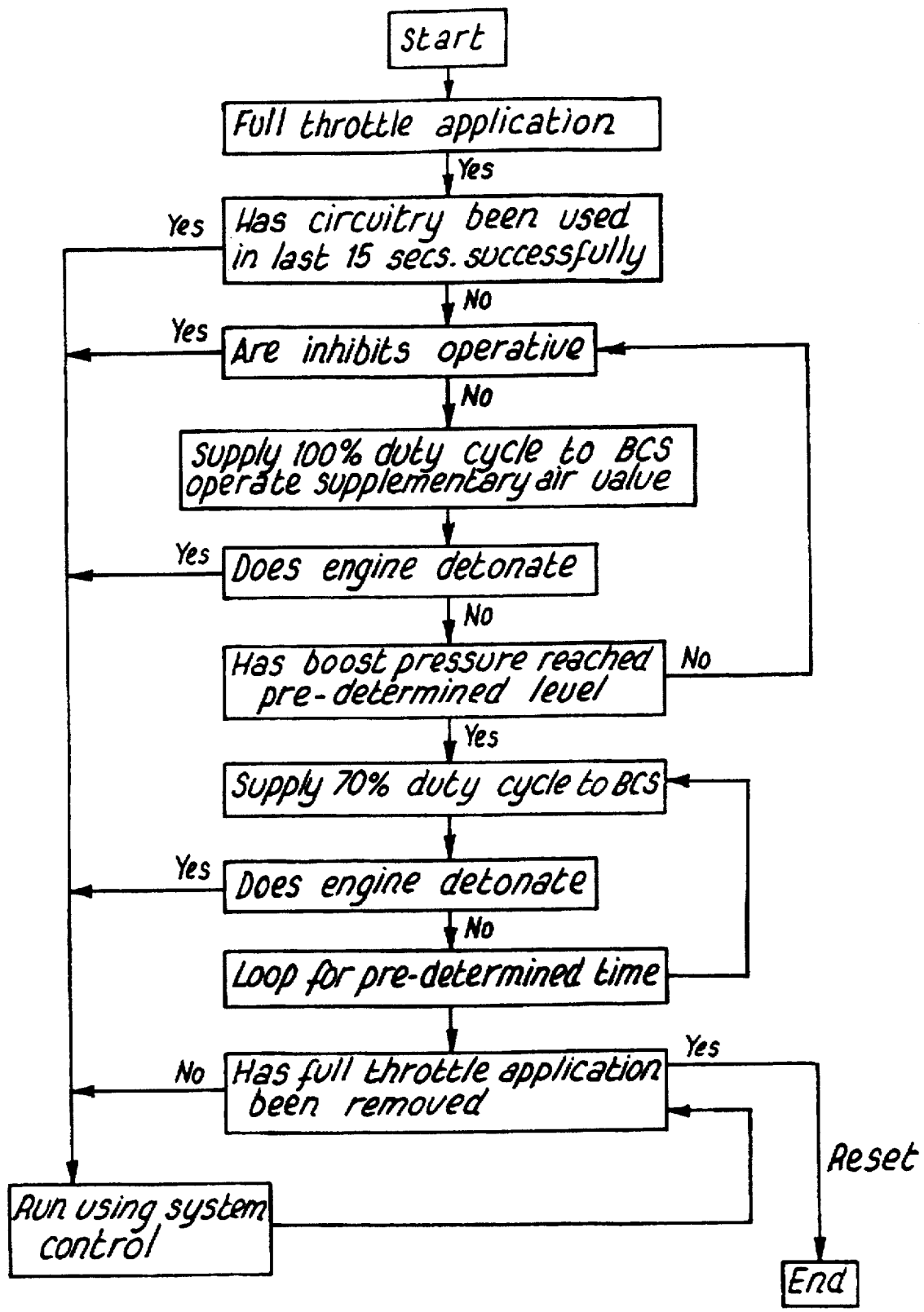
Figure 6:
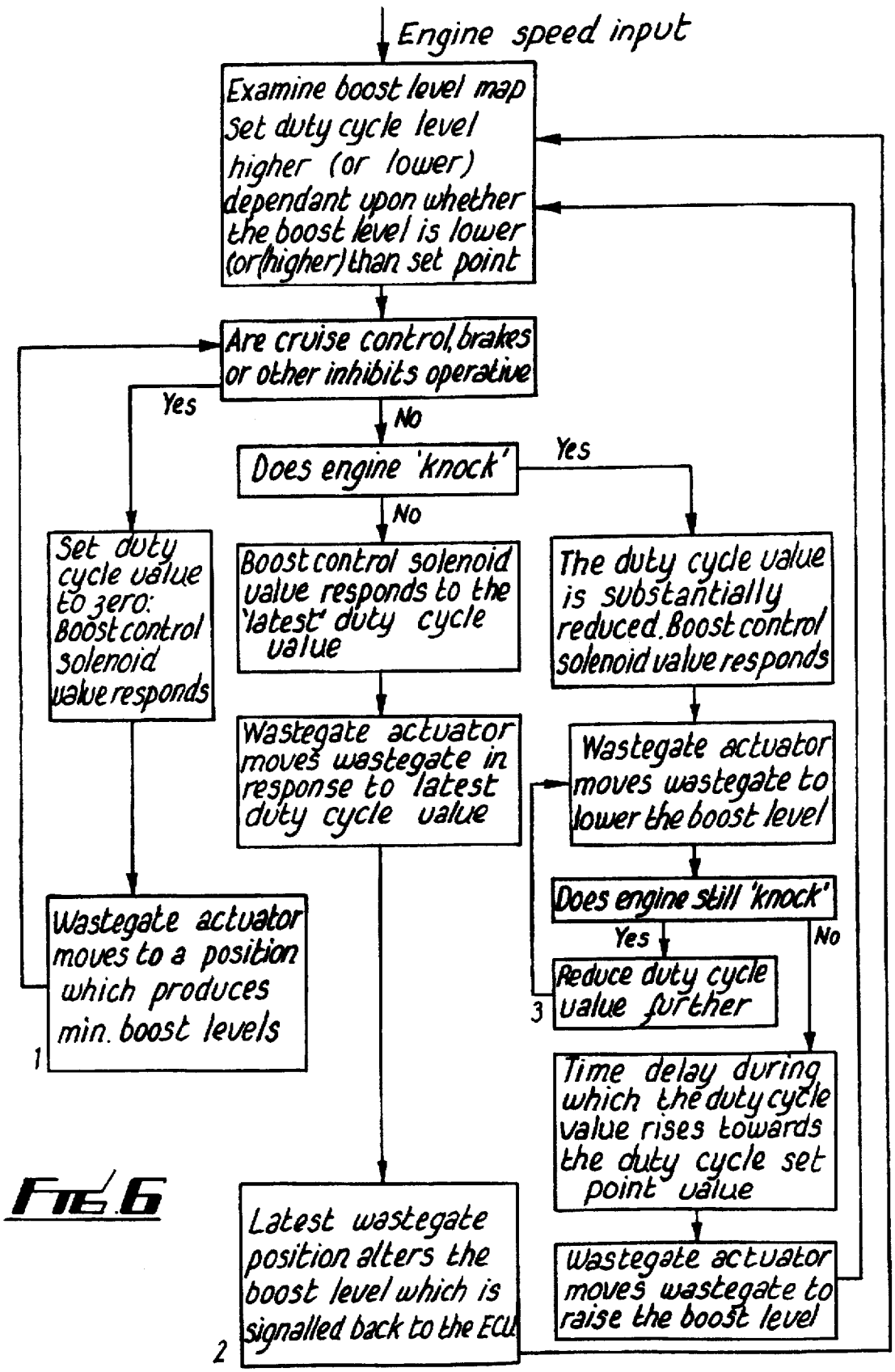
Figure 7:
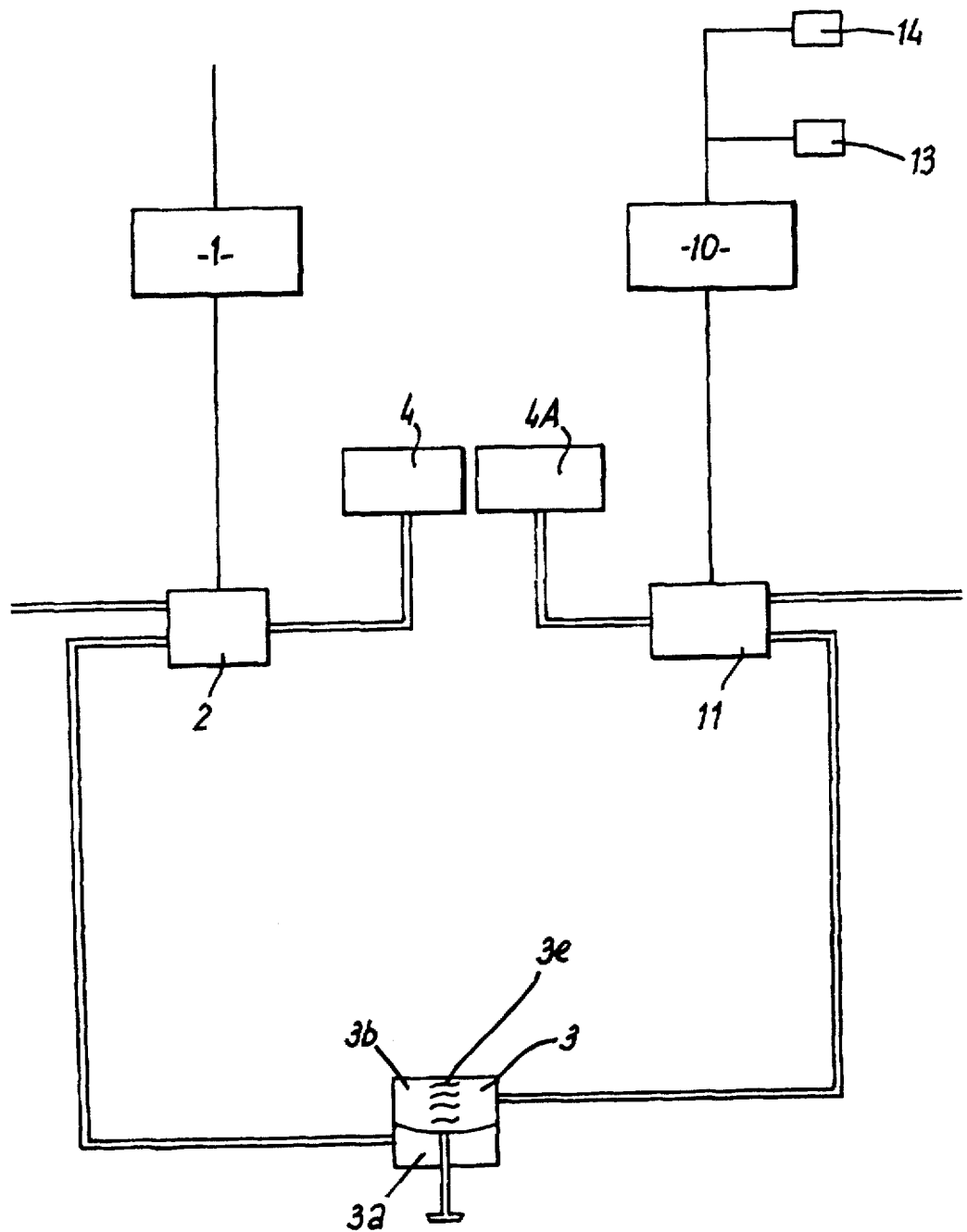
Figure 8A:
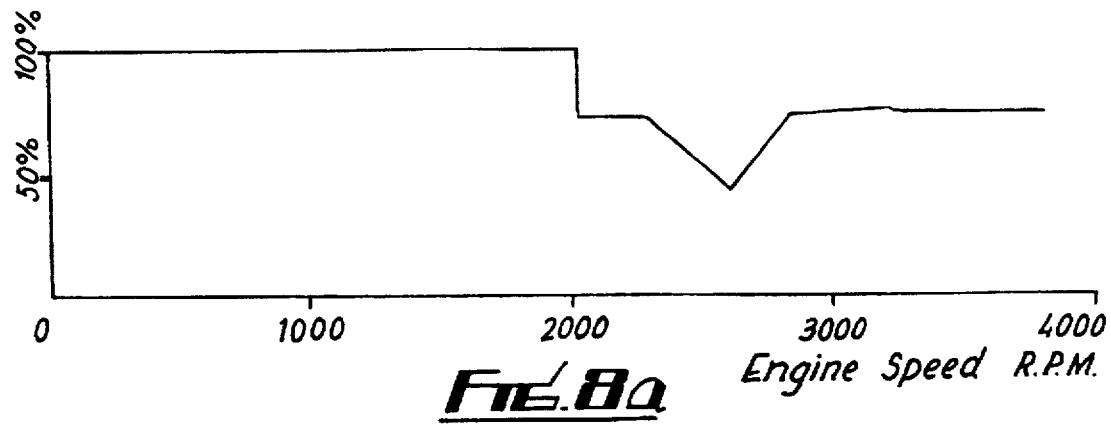
Figure 8B:
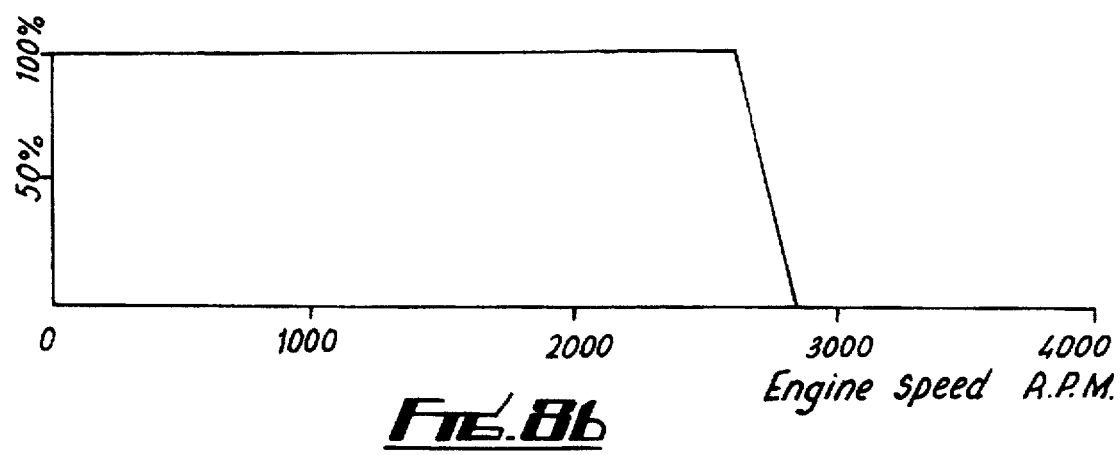
Figure 8C:
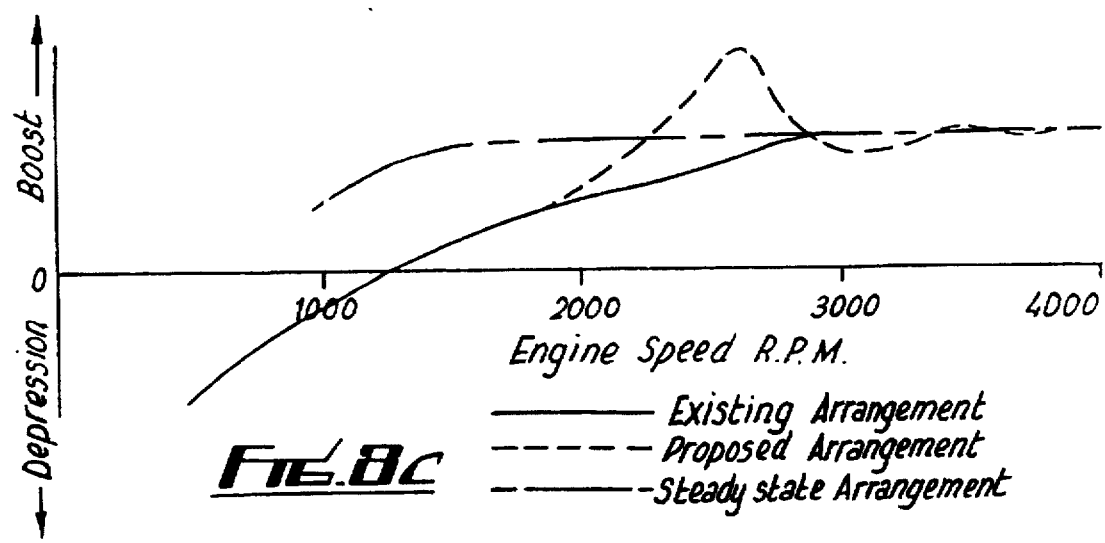

FIG. 4b shows engine inlet manifold pressures plotted against time for the arrangements of FIGS. 1 and 2 (that for FIG. 1 is shown in solid line and that for FIG. 2 is shown in dotted line), FIG. 4c shows the signal applied to a switchover valve plotted against time, FIG. 5 shows a logic sequence diagram for the operation of the system of FIG. 2, FIG. 6 shows a logic diagram similar to FIG. 5 but for the prior art system of FIG. 1, FIG. 7 shows an alternative embodiment to that of FIG. 2, FIG. 8a shows a graph of duty cycle against time, FIG. 8b shows a graph of switchover valve signal FIG. 8c shows a graph of manifold boost pressure against time (all graphs 8a, 8b and 8c under full throttle acceleration from rest for the embodiment of FIG. 7), and FIG. 9 shows a particular form of wastegate for the embodiment of FIG. 7.

Figure 10:
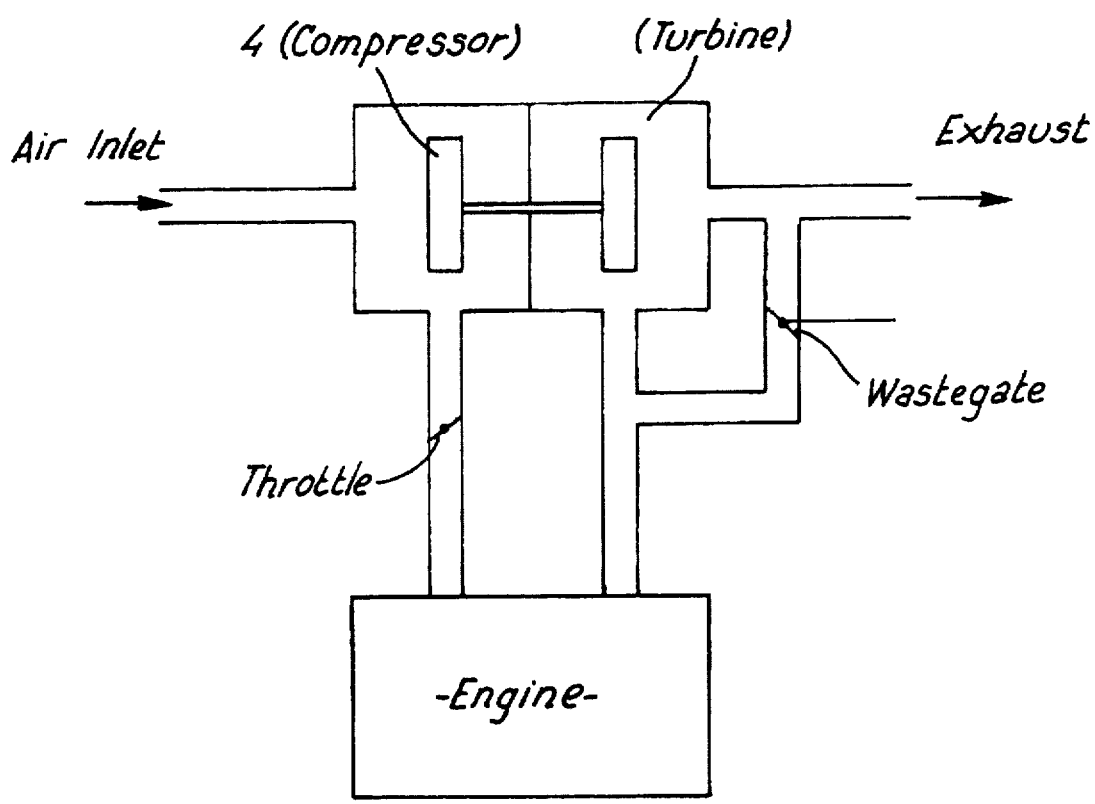

FIG. 10 is a schematic illustration of the engine, wastegate, compressor and throttle used with the control of the present invention.

Referring to FIG. 1, the system comprises a boost control electronic control unit (ECU) 1, a boost control solenoid valve 2 and a wastegate actuator 3. Under the control of the ECU, the solenoid controls air flow from an air pressure supply 4 via an air pressure line 5 and directs it either to a vent 6 or to the wastegate actuator 3 which in turn controls the wastegate (not shown). The boost control ECU receives signals via the vehicle wiring harness. These may comprise signals from knock sensors, cruise control devices, brake lights, boost pressure measurement devices and engine speed measurement devices.

Figure 3A:
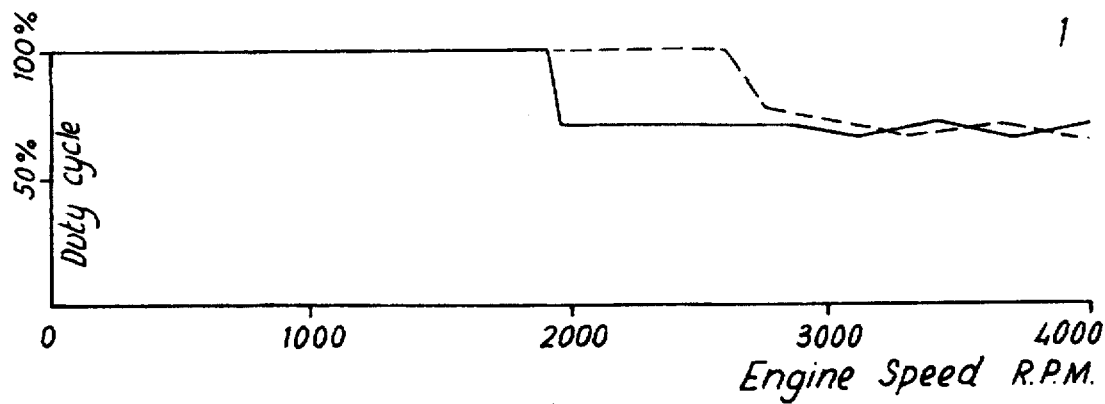
FIG. 3b shows engine inlet manifold pressures plotted against engine speed, the pressures corresponding to the duty cycle values of FIG. 3a, for the arrangements of FIG. 1 and 2 (that for FIG. 1 is shown in solid line, that for FIG. 2 is shown in dotted line and that for steady state arrangements is shown in chain line.

The boost control ECU 1 contains a duty cycle "map" similar to that shown in FIG. 3a and a boost "map" similar to that shown in FIG. 4a. The duty cycle map values are chosen such that the resultant boost values achieved from the engine will be slightly higher than the boost values contained within the boost map. An internal function of the boost control ECU 1 monitors the actual engine boost level. When the boost map value is reached, it is able to moderate the duty cycle signal to the boost control solenoid valve 2. The sisal is then less than that held within the duty cycle map. In response to this reduced signal, the wastegate opens further reducing the engine's capacity to produce boost. The boost level therefore falls. Once the boost level falls below the boost map value, the duty cycle signal is restored to that contained within the duty cycle map. This feedback system is continuous. The matching of the actual duty cycle to achieve the boost map levels and the values within the duty cycle map has to be made carefully. If the difference is too great wild oscillations in engine boost level may result. The frill load duty cycle map referred to above has maximum values of about 70% in practice. Similar values at low engine loads and speeds are near to 100%.

With the above described system, the wastegate, shown schematically with the engine and compressor in FIG. 10 operates in the following manner with the engine subject to full throttle acceleration from rest. In the rest condition, the engine is idling and the wastegate is fully shift with an electrical duty cycle signal of 100% being supplied to the boost control solenoid valve 2. When full throttle is applied, the engine quickly accelerates to the torque converter (gearbox) stall speed. At this speed, the value within the duty cycle full load map dictates that the wastegate should be opening in response to a 70% duty cycle. This is a problem condition. The wastegate is open and yet the boost value within the boost map has not been reached. The open wastegate is responsible for a degree of boost lag (and poorer performance than needs be). Once the boost level has reached the level within the boost map, the duty cycle is "moderated" as previously described. The engine is then running at something close to the desired steady state maximum power for the load condition. A logic sequence chart for the operation of this system is shown in FIG. 6.

It can be seen that the logic chart-allows three potential outcomes.

1) In response to any active inhibits, the boost control solenoid valve receives a duty cycle of zero. This fully opens the wastegate, for as long as the inhibits are active.

2) The wastegate position is constantly in a state of being altered, such that the engine boost level is controlled close to the desired 'map' values. This is the 'normal' steady state running condition for the engine.

3) under conditions of continuous engine 'knock' the duty cycle value 'sent' to the boost control solenoid valve will eventually reduce to a value of zero. This is not a 'normal' engine running condition.

The relationship between the boost ECU, boost control solenoid valve, wastegate actuator and wastegate position may be discerned from the schematic diagram of the existing boost control arrangement.

Referring to FIG. 2, in which equivalent parts bear the same reference numerals as in FIG. 1, the system of the invention comprises an additional electronic control unit (ECU) 10. This occupies the position of ECU 1 in FIG. 1 embodiment and communicates with the boost control ECU 1. Apart from the signals received by way of the vehicle wiring harness, the new ECU 10 also receives a signal from a full throttle sensor 13. The FIG. 2 system also comprises a switchover valve 11. This valve 11 and the boost control solenoid valve 2 are connected to receive signals from the new ECU 10. Airlines run from the switchover valve to the air pressure supply 4, the boost control solenoid valve 2, and the opposing side of the wastegate actuator 3. Solenoid valve 2 also leads to a vent 6 as in the FIG. 1 system and the switchover valve to a vent 12. The wastegate actuator comprises two chambers 3a and 3b separated by a diaphragm 3c to which is connected an actuating member 3d for the wastegate itself. Chamber 3a is the positive side of the actuator and chamber 3b is the negative or opposing side of the actuator. The diaphragm 3c is spring biassed by a compression spring 3e.

With the above described system, operation under full throttle acceleration of the engine from rest with the arrangement of FIG. 2 is as follows.

In the rest condition the engine is idling as before. The full throttle condition has not been used in the preceding 15 seconds and the brake inhibit is not active.

Full throttle is applied and the boost ECU 1 signal is overridden. A duty signal of 100% is applied to the boost control solenoid valve 2. A signal is supplied to the switchover valve in order to positively shut the wastegate, complementing the high signal sent to the boost control solenoid.

The wastegate stays shut until an overboost threshold is reached—this arrangement minimises boost lag considerations during this period.

Once the predetermined overboost threshold is reached the new ECU 10 provides a 70% duty cycle for a short period of time before returning control to the boost ECU 1 for the normal signal moderation control. The short period at 70% duty cycle Is necessary to avoid a massive boost undershoot correction on control handover.

A number of "fail safes" are incorporated into the new ECU 10, some of which are listed below:

1) Circuit can only 'overboost' once in any 15 second period (and not without backing off the throttle in the intervening period).

2) Engine detonation, cruise control and brake inhibits return control to boost ECU.

3) Wiring fault to air pressure boost sensor will return control to the boost ECU.

4) If overboost level is not achieved within a certain time period, control reverts to boost ECU.

The logic sequence chart for the above described operation is shown in FIG. 5.

The graph of FIG. 3a shows duty cycle against engine speed for both the existing and proposed arrangement. In this example it can be seen that the desired overboost pressure is reached at an engine speed of 2600 rpm and steady-state the control regained at 2750 rpm. It can be seen that the duty cycle values from the existing boost control system have been overridden from 2000 to 3600 rpm. In actual fact this system has been overridden from the moment of full throttle application. The example figures are such that the duty cycle values from the existing boost control system between idle and 2000 rpm, are the same as those by which they are being overridden.

Figure 3B:
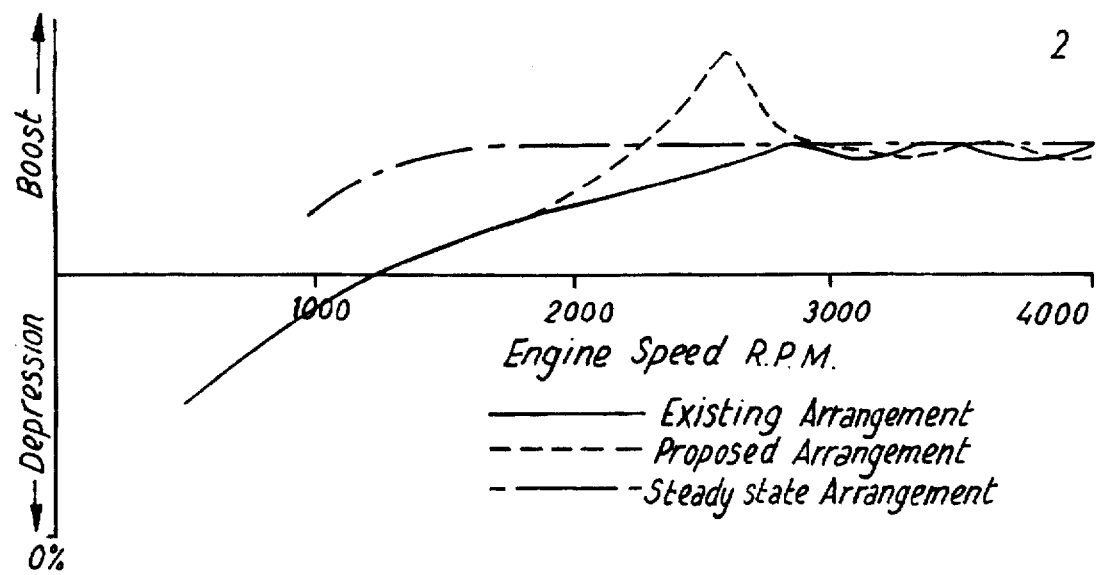

The graph of FIG. 3b shows engine inlet manifold pressures corresponding to the duty cycle values from the graph of FIG. 3a. In this example it can be seen that with the existing arrangement, the actual boost values lag the steady-state values until an engine speed of 2800 rpm. In this 'lag' region, the full capabilities of the engine are not being realized. In the proposed arrangement the actual boost value lags only until 2250 rpm. Between 2250 and 2750 rpm. the engine is being 'overboosted', fully exploiting the engine's transient capabilities.

The graph of FIG. 4a shows duty cycle against time whereas the graph of FIG. 4b shows the corresponding inlet manifold pressures. The graph of FIG. 4c shows the signal supplied to the switchover valve against time. The characteristic curves are the same as for the graphs of FIGS. 3a and 3b. The horizontal axes however distorted due to the flexible couplings within the transmission system of a real chassis.

This arrangement overcomes the prematurely opening wastegate problem. It also exploits the engine's ability to withstand engine boost levels higher than those steady state values for short periods of time.

The new ECU 10 can connect the prior art boost system to the control solenoid (using duty cycles infinitely variable between 0 and 100%) or override the prior art system with other duty cycles. Two values of 100% and 70% have been chosen by way of example, although a refinement of the system might call for more discreet steps (or variable steps) during this override period.

FIG. 10 illustrates the position of the wastegate 20 positioned in a bypass from the exhaust from the engine 22. Theoretically, the wastegate can be located anywhere in the air line from the compressor to the engine or from the exhaust from the engine to the turbine.

A second embodiment is shown in FIG. 7 in which parts equivalent to the embodiment of FIG. 2 bear the same reference numerals. In this second embodiment, the additional ECU 10 receives a signal from full throttle sensor 13 and pressure sensor mounted at the inlet manifold 14. The existing vehicle's boost control system remains in place. An additional switchover valve 11 is connected to receive signals from the additional ECU 10. Air lines run from the switchover valve to the air pressure supply 4A, and the opposing side of the wastegate actuator 3.

With the above described system, operation under full throttle acceleration of the engine from rest is as follows:

When full throttle is applied the additional ECU supplies a high signal to the switchover valve, causing a high pressure in wastegate chamber 3b. Whilst the engine is accelerating up to the torque converter stall speed, the standard boost ECU 1 supplies a high signal to the boost control solenoid 2, causing a low pressure in wastegate chamber 3a. The wastegate is therefore fully shut. Once the torque converter stall speed has been met, the duty cycle full load map within boost control ECU 1 dictates that the signal to the boost control solenoid is reduced to 70%. However, since the manifold boost pressure has not yet met the predetermined level set within the additional ECU, the high signal to the switchover valve is retained. This is sufficient to cause the wastegate to remain shut. When the steady-state manifold boost pressure is reached, the signal supplied by the standard boost control ECU to the boost control solenoid will further begin to reduce from 70%. The wastegate remains shut because a high signal from the additional ECU continues to be sent to the switchover valve. By ensuring that the pressure in wastegate chamber 3b is sufficiently high in consideration of the wastegate spring force 3e, exhaust back pressure and the pressure in wastegate chamber 3a, it is possible to ensure that a high signal at the switchover valve will shut, the wastegate valve under all full throttle engine operating conditions. The standard boost control is therefore overridden. Once the predetermined overboost threshold is reached, the additional ECU reduces the signal at the switchover valve gradually, causing a controlled reduction in manifold boost pressure. When the signal at the switchover valve reaches zero, the wastegate position is fully under the control of the signal which the standard ECU sends to the boost control solenoid. Standard operating conditions are therefore regained.

The graphs of FIGS. 8a, 8b and 8c shows duty cycle (boost control solenoid), signal (switchover valve) and manifold boost pressure against time, under full throttle acceleration from rest.

This system has significant benefits over an integrated boost and overboost system, in that it can easily be fitted as an addition to a standard boost control system. It is apparent that the system can be expanded such that existing sensors employed by the standard boost control system can be used. The first embodiment is one in which the existing manifold pressure sensor and knock sensor signals are employed, in conjunction with cruise control and brake inhibits. The two ECU's may nevertheless be combined to produce a fully integrated boost control system. In conjunction with control of engine fuelling and ignition, a fully integrated engine management system could be envisaged.

The significance of the switchover valve is as follows:

i. It enables a quick wastegate response, by positively shutting the wastegate when maximum boost is required.

ii. It can provide system independence, whereby the existing boost control system my be left in situ. This is of particular benefit to an 'after market performance kit'.

iii. It enables a high degree of insensitivity to exhaust block pressure. This is of particular importance when a 'popper' type valve is used as a wastegate. FIG. 9 shows such an arrangement. In this design it is possible for exhaust gas to leak past valve guide 20 and effectively bias the diaphragm 3c under high exhaust beck pressure conditions. A positive pressure on the opposing side 3b of the diaphragm, controlled by the switchover valve, can ensure that this unwelcome bias pressure does not begin to open the wastegate when full throttle acceleration conditions would benefit from a fully shut wastegate condition.

It wall be appreciated that the above embodiments have been described byway of example only end that many variations are possible without departing from the scope of the invention.

I claim:

1. A pressure charging apparatus for an internal combustion engine comprising:

an exhaust gas driven turbine driving a compressor for compressing engine intake gasses, wherein the flow of exhaust gas through said turbine is limited by a wastegate through which exhaust gasses may be redirected in order to bypass said turbine;

a wastegate actuator for opening and closing the wastegate and biased so that the wastegate is normally closed, said wastegate actuator being controlled by pneumatic pressure at two ports such that a positive pneumatic pressure at the first port acts to open the wastegate and a positive pneumatic pressure at the second port acts to close the wastegate;

a first valve means for regulating pneumatic pressure to the first port of said wastegate actuator, said first valve means being controlled by an electronic boost control unit;

a full throttle sensor for detecting full application of the engine's throttle; and a second valve means for regulating pneumatic pressure to the second port of said wastegate actuator, said second valve means being controlled by an electronic control unit, the electronic control unit receiving a signal from said full throttle sensor.

2. Pressure charging apparatus as claimed in claim 1, in which the means for supplying air comprises an air compressor (4).

3. Pressure charging apparatus as claimed in claim 1, in which the first valve means comprises a boost control solenoid valve (2) operative in one position to vent to atmosphere.

4. Pressure charging apparatus as claimed in claim 3, in which the boost control (1) is programmed to operate the boost control solenoid valve (2) at a duty cycle which may be infinitely variable between 0 and 100%.

5. Pressure charging apparatus as claimed in claim 3, in which the boost control (1) is programmed to operate the boost control solenoid valve at a duty cycle of 100%.

6. Pressure charging apparatus as claimed in claim 3, in which the boost control is programmed to operate the boost control solenoid valve (2) at a duty cycle of 70%.

7. Pressure charging apparatus as claimed in claim 1, in which second valve means (11) is operative to connect the wastegate actuator (3) to the means for supplying air or to atmosphere.

8. Pressure charging apparatus as claimed in claim 1 in which said second valve means (11) comprises a switchover valve and said boost control (1) and the control means (10) comprise a single unit and the control means (10) are programmed to operate the switchover valve between an open position where air from the air supply is fed to the wastegate actuator to open the wastegate and a closed position.

9. Pressure charging apparatus as claimed in claim 8, in which the control means (10) are programmed to operate the switchover valve in an infinitely variable manner between fully closed and fully open.

* * * * *